Figure 1:
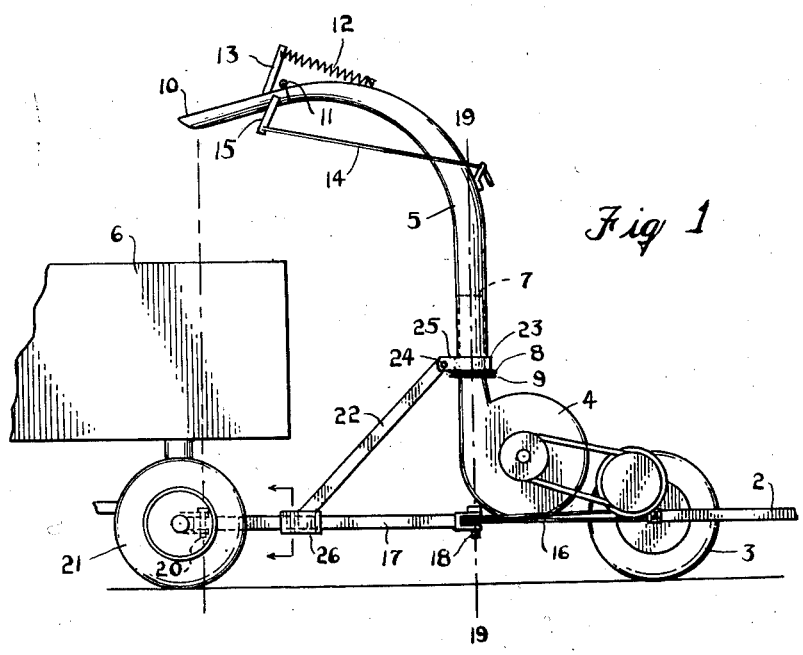

April 23, 1957  H. C. EBERLY  2,789,705

DISCHARGE SPOUT LOCATOR

Filed Dec. 1, 1953

INVENTOR.
Harry C. Eberly
BY Richard E. Babcock Jr.
Attorney

United States Patent Office 2,789,705
Patented Apr. 23, 1957

2,789,705

DISCHARGE SPOUT LOCATOR

Harry C. Eberly, New Holland, Pa., assignor, by mesne assignments, to Sperry Rand Corporation, New Holland, Pa., a corporation of Delaware Application December 1, 1953, Serial No. 395,572

4 Claims. (Cl. 214—42)

This invention relates to a blower discharge spout locator for use with a field forage harvester or other field traversing crop processing machine of the class which discharges the processed crop material rearwardly through a swivelled discharge spout into a trailing wagon, the draft tongue of the wagon being pivotally connected to the processing machine for swinging movement about an axis coincident or substantially coincident with that of the swivelled spout and the spout in turn being connected to the wagon for swinging movement responsive to changes in the position of the wagon relative to the processing machine.

In prior known arrangements of the above nature it has been attempted to provide means for maintaining the discharge end of the swivelled blower discharge spout over the wagon box of the trailing wagon by linkage means directly connecting the spout to the forward end of the wagon box. However, inasmuch as the forward end of the wagon box is customarily located well in advance of the front steering wheels of the wagon it necessarily becomes substantially offset to one side or the other of the path pursued by the front wagon wheels during the making of sharp turns. This resulting lateral displacement of the forward end of the wagon box functions to over-control the discharge spout during the making of sharp turns, and thus, may direct its discharge end outside of the wagon box at times with the result that the processed material is deposited on the ground and wasted.

The present invention has been conceived with the foregoing in mind and accordingly, has for its primary object to provide discharge spout locating mechanism which is capable of functioning at all times to maintain the discharge end of the spout accurately located or centered over a fixed location within the wagon box and the action of which will not be adversely affected in the manner abovementioned during the making of sharp turns.

To this end, and as has heretofore been done, the wagon tongue of the trailing wagon is pivotally connected or hitched to the processing machine for lateral swinging movement about an axis aligned or coincident with the swivelling axis of the discharge spout, and the discharge spout itself is connected in substantially vertically registering relation with the wagon tongue whereby these parts may move together about their common axis. By having the discharge spout extend horizontally coextensively with the wagon tongue, it will be seen that the discharge end of the spout will always be located directly over the rear end of the tongue at the connection of the latter to the wagon beneath the wagon box. In constructions where the wagon tongue is pivotally associated with the wagon structure and connected to the front wheels of the wagon to effect a steering action thereon in accordance with usual practice, it will be seen that the discharge end of the spout, being located directly over the location about which the wagon box swings or pivots relative to the front wheels, will thus at all times be located over a predetermined location within the wagon box.

Figure 2:
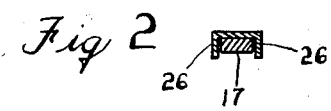

The foregoing as well as other incidental objects and advantages are all attained by the preferred embodiment of the invention illustrated by way of exemplification in the accompanying drawings in which:

Figure 1 represents a side elevational view of a field forage harvester and a trailing wagon operatively connected thereto, the discharge spout of the forage harvester being controlled by the mechanism of the invention, and both the wagon and field forage harvester being shown in part only; and, Figure 2, a cross-section of the line 2—2 of Figure 1 looking in the direction of the arrows.

Referring now in detail to the accompanying drawings, the field forage harvester or processing machine, which is illustrated more or less diagrammatically and fragmentarily, is of usual construction, comprising a rigid frame 2 supported on wheels 3 for ground traversing movement, the frame 2 being adapted for connection to a usual farm tractor to be drawn therebehind in conventional manner. It will be understood that as the forage harvester traverses the field, windrowed hay or other material is picked up by conventional pick-up means on the forage harvester and delivered rearwardly by suitable feed means into a suitable blower and chopper housing 4 in which rotates a conventional blower and chopper unit. Neither the pick-up and feed means nor the internal details of the chopper-blower unit 4 are shown in the accompanying drawing inasmuch as these features constitute no part of the present invention, but may be of any usual arrangement. The pick-up and feed mechanism, for instance, may be arranged as shown in the U. S. Patent to Huddle No. 2,496,472 of February 7, 1950.

The material, after being processed in the housing 4, is discharged through a rearwardly horizontally projecting discharge spout 5 which terminates over the wagon box 6 of the trailing wagon. It will be seen that the discharge spout 5 is rotatably swivelled about the vertically projecting discharge pipe 7 of the blower and that the spout 5 and discharge pipe 7 are both provided with radially projecting annular flanges 8 and 9, respectively, which function as thrust bearings to axially support the spout 5. At its discharge end over the wagon box 6, the spout 5 has a deflecting hood or deflector 10 pivoted thereon for vertical swinging movement to control the trajectory of the discharged material as desired. Normally the deflector 10 is urged upwardly about its pivotal connection 11 by means of a spring 12 connected between the spout 5 and an arm 13 fixed on the deflector. The deflector 10 may be manually controlled through a cord 14 connected to a depending arm 15 on the deflector to direct the discharged material longitudinally of the wagon as desired.

It will be seen that the forage harvester frame includes a rigid rearwardly projecting extension or hitch portion 16 and the tongue 17 of the wagon is pivotally connected to this hitch portion 16 as by the hitch pin 18 for swinging movement about an axis coincident with the swivelling axis of the spout 5, the common axis of swinging movement of the spout 5 and wagon tongue 17 being indicated by the broken line 19—19.

The rear end of the wagon tongue 17 is pivotally connected to the frame of the wagon as at 20 for lateral swinging movement and in accordance with usual practice the front steering wheels 21 of the wagon are controlled or steered responsive to swinging of this tongue 17 through conventional linkage means not shown.

Preferably the discharge spout 5 will be horizontally coextensive with the tongue 17 so that the discharge end of spout 5 is located directly above the wagon box in substantial vertical registry with the pivot 20.

Except for the location of the discharge end of spout 5 over the pivotal axis 20, all of the above described structure is old and well known in the art, as exemplified by the Huddle Patent 2,496,472 abovementioned.

In accordance with my invention suitable means are provided for interconnecting the discharge spout 5 and the wagon tongue 17 in substantially vertically registering relation for movement together about their common axis 19—19 whereby the discharge end of the spout 5 will be maintained at all times over the pivotal connection 20 between the wagon and its tongue.

One suitable embodiment of such means consists in the control arm 22 which is connected to a collar 23 fixed on the spout 5 for rotation with the collar and spout about the axis 19—19. The arm 22 is vertically hinged as at 24 in a clevis 25 on collar 23 for vertical swinging movement, and its free lower end, which rests on the wagon tongue 17, is formed as an inverted U-shaped yoke, the sides 26 of which depend on opposite sides of the tongue 17. Thus the control arm 22 by its engagement with the wagon tongue 17 will cause the discharge spout 5 to swing with the tongue 17 and thus at all times to be in vertical registry with said tongue. It will be seen that the pivotal connection 24 and the yoke 26 of arm 22 are so arranged as to permit such vertical movement of the wagon tongue 17 about its pivotal connection 18 as may occur during passage of the forage harvester and wagon over uneven terrain, the hitch pin 18 being loosely disposed through the members 16 and 17 in accordance with usual practice to permit such vertical play. During such vertical movement, of course, the yoke 26 is freely slideable longitudinally of the tongue 17 to permit the tongue 17 and arm 22 to swing vertically together.

In the operation of the foregoing mechanism as the trailing wagon follows the field forage harvester around turns, the wagon tongue and the discharge spout 5, due to their interconnection by the arm 22, will swing together about the common axis 19—19 to maintain the spout 5 at all times in vertical registry with the tongue 17. Inasmuch as the discharge spout 5 is horizontally coextensive with the wagon tongue 17 its discharge end will always be located directly above the pivotal connection 20 of the wagon tongue to the wagon frame. Since the intersection of the pivotal axis 20 with the bottom of the wagon box remains substantially fixed despite lateral swinging of the wagon tongue 17 and despite steering movement of the wheels 21 relative to the wagon box 6, it will be apparent that the discharge end of the spout 5 will thus be maintained at all times centered over a predetermined location within the wagon box to efficiently discharge material thereinto.

In this application I have shown and described only the preferred embodiment of the invention simply by way of setting forth the best mode contemplated by me of carrying out my invention. However, I recognize that the invention is capable of other and different embodiments and that its several details may be modified in various ways, all without departing from the invention. Accordingly, the drawings and description herein are to be considered as merely illustrative and not as exclusive in nature.

Having thus described the invention I claim:

1. In combination with a field traversing crop processing machine having a horizontally projecting discharge spout swingable about a substantially vertical axis, a wagon having a tongue pivotally connected to said machine at one end for relative movement about said axis, the other end of said tongue being pivoted to said wagon for lateral swinging movement, the spout being substantially horizontally coextensive with said tongue, and means interconnecting said spout and tongue in substantially vertically registering relation for movement together about their common axis, whereby the discharge end of said spout will be maintained at all times over the pivotal connection between said wagon and its tongue.

2. In combination with a field traversing crop processing machine having a horizontally projecting discharge spout swingable about a substantially vertical axis, a wagon having a tongue pivotally connected to said machine at one end for relative movement about said axis, the other end of said tongue being pivotally connected to said wagon for lateral swinging movement about a vertical axis, said spout being substantially horizontally coextensive with said tongue in vertical registry therewith and having a discharge end disposed over said wagon, and means interconnecting said spout and tongue whereby the spout is maintained in substantially vertically registering relation with said tongue during the making of a turn.

3. A field traversing crop processing machine, a wagon, a tongue pivotally connected at one end to said wagon, for lateral swinging movement, and at its other end to said machine for relative movement about a vertical axis, a device carried on said machine adapted to elevate processed crop material and deposit it in said wagon, said device including a discharge spout swingable about said vertical axis, said discharge spout being substantially horizontally coextensive with said tongue, in vertical registry therewith, and having a discharge end disposed over said wagon, and means interconnecting said discharge spout and said tongue whereby when said tongue is swung laterally during the making of a turn said discharge spout is correspondingly swung about said vertical axis to maintain the coextensive registry between the spout and tongue, said interconnecting means comprising a radial arm connected at one end to said discharge spout for movement therewith and swingable vertically relative thereto, the free end of said radial arm being slideably connected to said wagon tongue for swinging movement therewith.

4. A field traversing crop processing machine, a wagon, a tongue having one end pivotally connected to said wagon, for lateral swinging movement, and its opposite end pivotally connected to said machine for relative movement about a vertical axis, a device carried on said machine adapted to elevate processed crop material and deposit it in said wagon, said device including a discharge spout swingable about said vertical axis, said discharge spout being substantially horizontally coextensive with said tongue, in vertical registry therewith, and having a discharge end disposed over said pivotal connection between said tongue and said wagon, and means interconnecting said discharge spout and said tongue whereby when said tongue is swung laterally during the making of a turn said discharge spout is correspondingly swung about said vertical axis to maintain the coextensive registry between the spout and tongue, and said discharge end of the spout over the tongue-wagon pivoted connection, said interconnecting means comprising a radial arm connected at one end to said discharge spout for movement therewith and swingable vertically relative thereto, the free end of said radial arm being slideably connected to said wagon tongue for swinging movement therewith.

References Cited in the file of this patent

UNITED STATES PATENTS

| | | |
|---|---|---|
| 2,496,472 | Huddle | Feb. 7, 1950 |
| 2,608,310 | De Penning | Aug. 26, 1952 |
| 2,634,004 | Turek | Apr. 7, 1953 |